UNITED STATES PATENT OFFICE.

JOHN W. HYATT, JR., OF ALBANY, NEW YORK, ASSIGNOR TO THE HYATT MANUFACTURING COMPANY, OF SAME PLACE.

IMPROVED METHOD OF COATING BILLIARD-BALLS, &c.

Specification forming part of Letters Patent No. 88,634, dated April 6, 1869.

*To all whom it may concern:*

Be it known that I, JOHN W. HYATT, Jr., of the city and county of Albany, in the State of New York, have invented a new and Improved Method of Coating Billiard and other Balls; and I do hereby declare that the following is a full, clear, and exact description thereof.

This invention is designed especially for improving the appearance and rendering very durable and hard the surfaces of billiard and other balls which are made of substances that are not capable of receiving or retaining a fine polish, and which cannot be colored and made to present the handsome appearance of ivory.

To enable others skilled in the art to understand my invention, I will proceed to describe it.

I take a ball which is made of composition, or a substance of inferior appearance, and suspend it between two points, so that it can be rotated freely about its axis. While thus held the ball is dipped into a solution of collodion, and when removed therefrom it is rotated slowly, so as to cause the collodion to flow evenly over its surface, and when dry to form thereon a thin skin or coating. This is repeated any required number of times until a proper thickness of collodion is obtained upon the ball, after which the ball may be turned true and polished, when the coating will present a beautiful glazed appearance.

By mixing with the collodion any pigment or coloring matter that is soluble in the alcohol or other solvent of the gun-cotton, the coating of the balls may be given any desired color or shade of color.

While I prefer to finish the coated balls by turning, they may be rendered perfectly spherical and smooth by pressing them in heated molds, which latter process will also expel the air from the coating and render it more solid and firm.

When collodion is properly colored and applied to the surfaces of balls, as I have above described, it will not only present the appearance of ivory, but it will form a coating or covering which will retain the coloring matter mixed with it, and which will not be liable to chip off or become marred in consequence of rough usage.

Having described my invention, what I claim as new, and desire to secure by Letters Patent, is—

A billiard or other ball which is coated substantially as described.

JOHN W. HYATT, JR.

Witnesses:
R. T. CAMPBELL,
JULIUS HIRSCH.